United States Patent Office 3,545,920
Patented Dec. 8, 1970

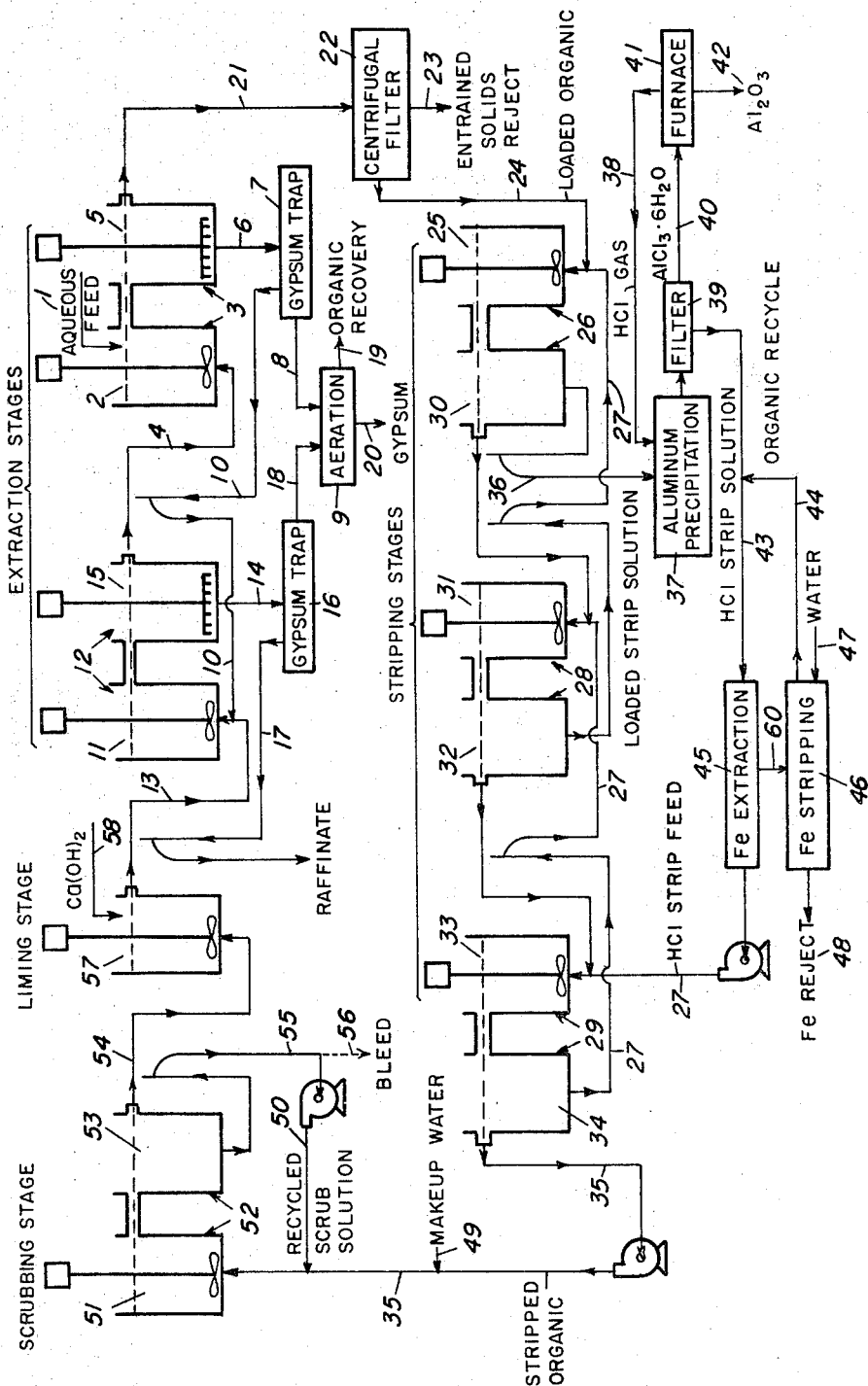

---

3,545,920
PROCESS FOR EXTRACTING ALUMINUM FROM SOLUTIONS
D'Arcy R. George, Salt Lake City, and Samuel Ralph Borrowman, Bountiful, Utah, assignors to the United States of America as represented by the Secretary of the Interior
Filed Feb. 26, 1968, Ser. No. 708,010
Int. Cl. C01f 7/56, 7/66
U.S. Cl. 23—92                            8 Claims

ABSTRACT OF THE DISCLOSURE

A process for extracting aluminum from aqueous solutions with organic alkyl phosphoric acids is presented. The organic extractant is contacted with the aluminum containing feed at a pH of from about 2–4, stripped with acid to form an aluminum compound which can, if desired, be conventionally treated to produce alumina.

BACKGROUND OF THE INVENTION

Field of the invention

This invention relates to the field of alumina and aluminum compound production. More specifically, it raltes to a method of recovering aluminum values from acidic waste solutions.

Description of prior art

A variety of neutralizaton, evaporation and precipitation techniques have been developed for the purpose of recovering alumina from waste solutions. The object of these processes was to tap the vast supply of aluminum contained in industrial and mine wastes. Typical examples are waste liquors discarded in producing catalyst-supporting materials from clays, liquors from uranium mills using acid leach process, acid mine waters from iron and coal mines, and waste solutions resulting from the extraction of copper from waste dumps at porphyry copper mining operations.

None of the prior art processes has presented an economically attractive alternative to alumina production from bauxite.

Briefly, the present invention involves recovery of aluminum from acidic waste solutions by extraction with an alkyl phosphoric acid and stripping with acid.

Accordingly, the general object of this invention is to present a process for the recovery of aluminum values from acid waste solutions. More specifically, it is an object of this invention to provide an improved process of removing aluminum values from acidic waste solutions by extraction with an alkyl phosphoric acid. These and other objects and advantages of this invention will become apparent upon the following description of the drawing and preferred embodiments.

BRIEF DESCRIPTION OF THE DRAWING

The accompanying drawing is a schematic illustration of a flow-plan for a process according to the present invention.

DESCRIPTION OF PREFERRED EMODIMENTS

Our process for recovering aluminum values from industrial and mineral processing wastes is based upon the ability of certain organophosphorus compounds to extract aluminum from weakly acidic solutions. We have discovered that the alkyl phosphoric acids are particularly useful in aluminum extraction. Examples of alkyl phosphoric acids are; di-2-ethylhexyl phosphoric acid, hexadecyl phosphoric acid, monoheptadecyl phosphoric acid, and monododecyl phosphoric acid. A monoalkyl phosphoric acid and in particularly monododecyl phosphoric is preferred. The preparation of these acids involves reacting the appropriate alcohol with phosphorous pentoxide or phosporous oxychloride. For example, monododecyl phosphoric acid is prepared by first reacting with $P_2O_5$ with 2,6,8-trimethyl-4 nonanol. This reaction yields predominately the pyrophosphoric acid which is hydrolyzed to the mono acid form with HCl. As used in the present invention, the alkyl phosphoric acids will be dissolved in a water immiscible inert organic solvent such as benzene, kerosine, hexane and the like. The particular solvent selected is not critical although kerosine is preferred for economic reasons. For the purposes of this disclosure the acids will be represented by the general formula:

$$HPO_4RR'$$

where:

R = an alkyl group
R' = an alkyl group or H+

Extraction of aluminum from an aqeuous phase with an organic phase containing an alkyl phosphoric acid involves an exchange of aluminum ions for hydrogen ions. The reaction is illustrated as follows:

$$\underset{\text{(aqueous)}}{Al^{+3}} + \underset{\text{(organic)}}{3(HPO_4RR')} \rightleftarrows \underset{\text{(organic)}}{Al(PO_4RR')_3} + \underset{\text{(aqueous)}}{3H^+} \quad (1)$$

This extraction is strongly dependent upon pH. Extraction of aluminum is obtained only in the pH range of from 2 to 4 and efficient extraction is had only in the preferred range of from 2.8 to 3.2. This optimum pH is about 3.1. The equation above shows that hydrogen ions are continually added to the aqueous phase as extraction proceeds. If allowed to proceed unchecked, the pH of the aqueous phase would fall causing extraction efficiency to drop and eventually preventing any transfer of aluminum ions to the organic phase. To compensate for the transfer of hydrogen ions to the aqueous phase, that phase must be continuously neutralized. The importance of pH maintenance is illustrated in Table I below which shows the effect of pH on an extraction of aluminum from a aqueous sulfate solution by contact with a kerosine solution containing 0.4 N monododecyl phosphoric acid.

TABLE I.—EFFECT OF pH EXTRACTION COEFFICIENT
(ORGANIC/AQUEOUS=2/1)

| Aqueous pH | Al in organic extract, g./l. | Al in aqueous raffinate, g./l. | Extraction coefficient $E^o/a$ | Percent Al extracted |
|---|---|---|---|---|
| 2.6 | 2.1 | 1.88 | 1.1 | 65.8 |
| 2.8 | 2.56 | 1.04 | 2.5 | 81.1 |
| 3.0 | 2.46 | .70 | 3.5 | 86.7 |
| 3.1 | 2.5 | .64 | 3.9 | 88.4 |
| 3.25 | 2.7 | .86 | 3.1 | 84.4 |
| 3.4 | 2.1 | 1.26 | 1.7 | 77.1 |
| 3.6 | 1.0 | 2.66 | .4 | 5.16 |

Any base may be used to maintain pH control in the aqueous phase although less expensive materials such as limestone, lime, hydrated lime or their dolomitic equivalents are preferred. Theoretical requirements are 1.5 moles base to 1 mole of aluminum.

Finely ground limestone may be added directly to the extraction circuit mixers as an aqueous slurry or as a dry powder. It is not practical to add lime or hydrated lime in this manner because their high reactivity causes local precipitation of metal hydroxides which entrain the organic extractant. Lime or hydrated lime may be used, however, to convert the alkyl phosphoric acid to the calcium salt prior to its use as an extractant. Conversion to the calcium salt is illustrated by the following equation.

$$Ca^{+2}+2(OH)^-+2HPO_4RR' \rightleftharpoons Ca(PO_4RR')_2+2H_2O \quad (2)$$

If this method of pH control is used, extraction of aluminum will occur by an exchange of $Ca^{+2}$ for $Al^{+3}$ according to the final reaction.

$$2Al^{+3}+3Ca(PO_4RR')_2 \rightleftharpoons Al_2(PO_4RR')_3+3Ca^{+2} \quad (3)$$
(aqueous) (organic) (organic) (aqueous)

When a base such as lime is used to convert the alkyl phosphoric acid to its clacium salt only about three-fourths of the alkyl phosphoric acid is converted to the calcium form. Consequently, the organic is loaded with aluminum to only about three-fourths of theoretical capacity and the consumption of $Ca(OH)_2$ is nearly stoichiometric at pH values of 3.1 or lower. With larger additions, a more complete conversion of the alkyl phosphoric acid to its calcium salt is obtained, but because all the calcium is not displaced by aluminum, consumption of a calcium containing base is increased. This effect is shown in Table II below:

TABLE II

| pH | Gm. of $Ca(OH)_2$ per gm. of $Al_2O_3$ | $Ca(OH)_2$ excess, percent |
|---|---|---|
| 2.6 | 2.25 | 3.7 |
| 2.8 | 2.26 | 4.1 |
| 3.0 | 2.31 | 6.5 |
| 3.1 | 2.28 | 5.1 |
| 3.25 | 2.47 | 13.8 |
| 3.4 | 2.55 | 17.5 |
| 3.6 | 3.70 | 69.2 |

Furthermore, the presence of undisplaced calcium in the organic phase after extraction increases the acid requirements necessary to strip aluminum from that phase. Hence, the use of excess base is undesirable.

When aluminum is extracted from sulfate solutions using limestone, lime, or hydrated lime for pH control, calcium sulfate in formed and precipitates in the extraction circuit as gypsum ($CaSO_4 \cdot 2H_2O$). The yield is 1.5 moles of gypsum per mole of aluminum or approximately 2.58 grams per gram of aluminum extracted. If dolomite, dolomitic lime, or hydrated dolomitic lime are substituted, the formation of gypsum is reduced in proportion to the lower calcium content and the accompanying magnesium is converted to magnesium sulfate which is soluble.

Precipitation of gypsum in the extraction circuit results in some entrainment of the organic phase and although the amount entrained is only about 0.04 milliliters per kilogram of gypsum, more than 90 percent of entrained organic can be recovered by agitating and aerating a thickened slurry of the gypsum in a floatation cell. The entrained organic rises to the surface and can be removed by skimming.

Following the extraction of aluminum from the aqueous phase, the phases are separated and aluminum is stripped from the loaded alkyl phosphoric acids by contacting the organic phase with an acid such as hydrochloric, sulfuric or nitric. The stripping reactions for these acids are as follows:

$$Al(PO_4RR')_3+3HCl \rightarrow AlCl_3+3HPO_4RR' \quad (4)$$

$$2Al(PO_4RR')_3+3H_2SO_4 \rightarrow Al_2(SO_4)_3+6HPO_4RR' \quad (5)$$

$$Al(PO_4RR')_3+3HNO_3 \rightarrow Al(NO_3)_3+3HPO_4RR' \quad (6)$$

Stripping efficiencies of 90 to 95 percent are obtained when using 6 to 8 N HCl at ambient temperatures, 6 to 8 N $HNO_3$ at ambient temperatures or with 6 to 8 N $H_2SO_4$ at 80 to 90 C.

Aluminum values are recovered from the stripping solution by evaporation and crystallization to form aluminum chloride, nitrate, or sulfate which can be marketed in the salt form or converted into alumina by thermal decomposition. Decomposition of nitrate and sulfate salts yields nitrogen oxides or sulfur oxides which, may be converted by well known processes into nitric or sulfuric acid and recycled to the stripping operation. Decompositoin of aluminum chloride yields HCl gas which can be recovered and recycled.

Aluminum chloride can be removed from a chloride solution by gassing with anhydrous HCl. The reaction is very selective producing a highly crystalline aluminum chloride cake that can be washed to yield a product containing less than 0.05 percent total impurities. Gas precipitation does however require a large volume of cooling water because it is so highly exothermic and, precipitation of aluminum is incomplete necessitating a substantial recycle. Consequently, the choice between evaporation with fractional crystallization and gaseous precipitation will be based primarily on the economics of each particular situation.

In cases where aluminum is to be recovered from acid solutions containing iron a minor amount of iron up to about 0.01 gram per liter of organic extractant will be transferred to the organic phase. Iron can be removed by contacting the strip liquors with a kerosine solution containing about 10 percent tributyl phosphate plus about 13 percent isodecanol or 10 percent tertiary alkyl amine plus 10 percent isodecanol. The iron is extracted as a ferric complex and stripped with water.

A flow plan of a complete process for recovering alumina from an acidic waste solution is shown in the accompanying drawing. There, 1 represents an aqueous feed containing aluminum and sulfate ions. It is directed into the mixer portion 2 of the a first mixer-settler unit 3. In mixer 2 it is brought into contact with stream 4 containing a mixture of calcium loaded and aluminum loaded alkyl phosphoric acid. Here reaction (3) referred to above takes place. In the settler portion 5 of unit 3, the lighter organic phase containing extracted aluminum forms on top of an aqueous phase. Gypsum is precipitated in the aqueous phase and settles to the bottom of settler 5. A slurry 6 containing aqueous phase liquid and solid gypsum is withdrawn from settler 5 and passes through a gypsum trap 7. There the solid gypsum is removed from the aqueous phase. Gypsum 8 from trap 7 is sent to an aeration cell 9 where any organic that has been entrained within the gypsum in unit 3 is removed by froth floatation, while the clarified aqueous solution 10 recovered from trap 7 is passed to the mixer portion 11 of a second mixer-settler unit 12. In mixer 11 solution 10 is intimately mixed with organic solution 13 containing a calcium salt or an alkyl phosphoric acid in an inert water insoluble organic diluent such as kerosine. The mixing causes a transfer of aluminum and calcium ions according to Equation 3 above with an accompanying precipitation of gypsum. A combined slurry of gypsum and aqueous phase liquid 14 is withdrawn from settler portion 15 and passes through a second gypsum trap 16 which separates the solid gypsum from the aqueous solution. The clarified aqueous solution, depleted in aluminum after passage through mixer-settlers 3 and 12, is disposed of as raffinate 17. Gypsum 18 leaving trap 16 is sent to aeration cell 9 where by froth floatation, any organic solution 19 that ahs been entrained in the gypsum in unit 12 is removed and recovered. Gypsum 20 from cell 9 is removed from the system.

Returning now to mixer-settler 3, an aluminum enriched organic solution 21 is withdrawn from settler portion 5 and is sent to a centrifugal filter 22 where any solids entrained in solution 21 are removed and rejected at 23. The clarified organic solution 24 laden with aluminum flows to mixer portion 25 of mixer-settler 26. There, according to reaction (4) above, the aluminum is stripped from the organic solution by contact with a HCl strip solution 27. The stripping sequence is a countercurrent contact of aluminum laden organic solution with HCl in mixer-settlers units. The present drawing shows three such units. Thus, in addition to mixer-settler 26, units 28 and 29 are also a part of the stripping circuit. The loaded organic passes through mixer 25 of unit 26, settler 30 of unit 26 then to mixer 31 of unit 28, settler 32 of unit 28 and finally through mixer 33 and settler 34 of unit 29 to form a stripped organic solution 35. An aqueous HCl stripping solution 27 is fed in a generally counter current fashion to the mixer of units 29, 28 and then 26 to form a final aluminum loaded effluent solution 36 from settler 30. The loaded strip solution is directed to an aluminum precipitation zone 37. There, solution 36 is contacted with a stream 38 of anhydrous HCl gas causing a precipitation of $AlCl_3 \cdot 6H_2O$ and a strengthening of the HCl solution. The $AlCl_3 \cdot 6H_2O$ precipitate is removed by filter 39 and then sent via line 40 to a furnace 41 where it is roasted. The roasting drives off HCl gas 38 for recycle and leaves a $Al_2O_3$ product 42. The filtered aqueous HCl strip solution 43, which generally contains some iron, depending upon the composition of feed, is mixed with an organic extractant 44 such as a kerosine solution containing 10 percent tributyl phosphate. The mixture is passed to an iron extration zone 45 where iron is extracted from the aqueous phase into the organic phase and the two phases are separated. The resulting iron depleted aqueous HCl phase 27 is recycled to mixer 33, whereas the iron laden organic phase 60 is passed to an iron stripping zone 46 where iron is removed from the organic solution by contact with a stream of water 47. The stripped organic 44 is recycled for further use and stream 48 containing stripped iron is removed from the system.

Returning to settler 34, the stripped organic extractant 35 is mixed with a water stream 49 and a recycled scrub solution 50 before passing into mixer 51 of mixer-settler unit 52. From there the mixture is passed to settler 53 where an organic phase 54 and an aqueous phase 55 are separately withdrawn. A portion of the latter comprises recycle scrub solution 50 and the remainder 56 is bled from the system. The scrubbed organic solution 54 is then passed to a mixer 57 where it is treated with calcium hydroxide 58 to convert the alkyl phosphoric acid in stream 54 to the calcium form in accordance with reaction (2) above. Effluent 13 from mixer 57 comprises the organic extractant fed to mixer 11 of unit 12.

While the invention has been described in terms of the preferred embodiments referred to above, it will be apparent to those skilled in the art that various modifications, alternatives and additions can be made to the process without departing from the spirit and scope of the invention.

What is claimed is:
1. A method of recovering aluminum values from an aqueous solution containing aluminum ions comprising of steps of:
(a) contacting said solution with an aqueous immisicible organic solution comprising an inert organic solvent and a solute consisting of a calcium salt of an alkyl phosphoric acid in the pH range of from about 2.8 to about 3.2 thereby causing the transfer of said aluminum ions from said aqueous solution to said organic solution;
(b) separating said aluminum loaded organic solution formed in step (a) from said aqueous solution;
(c) contacting said aluminum loaded organic solution with an aqueous inorganic acid solution, said inorganic acid chosn from the group consisting of hydrochloric, nitric and sulfuric acids, thereby causing the transfer of aluminum ions from said organic to said aqueous acid solution;
(d) separating the aluminum loaded aqueous solution formed in step (c) from said organic solution; and
(e) concentrating said aluminum loaded aqueous phase separated in step (c) to precipitate an aluminum salt.

2. The method of cllaim 1 wherein said alkyl phosphoric acid is a monalkyl phosphoric acid.

3. The method of claim 1 wherein said aqueous solution containing aluminum ions also contains sulfate ions and wherein said solute consists of a calcium salt of a monoalkyl phosphoric acid.

4. The method of claim 1 wherein said organic solvent is a member of the class consisting of kerosine, benzene and hexane.

5. The method of claim 2 wherein step (e) is accomplished by evaporation.

6. The method of claim 2 wherein said inorganic acid is hydrochloric and wherein step (e) is accomplished by contacting the aqueous solution separated in step (d) with anhydrous hydrogen chloride.

7. The method of claim 1 wherein said organic solution separated in step (d) is recycled to step (a).

8. The method of claim 7 wherein said alkyl phosphoric acid is a monoalkyl phosphoric acid and wherein organic solvent is selected from the class consisting of kerosine, benzene and hexane.

References Cited
UNITED STATES PATENTS

| | | | |
|---|---|---|---|
| 1,778,083 | 10/1930 | Marburg | 23—92 |
| 2,217,099 | 10/1940 | Burman | 23—92X |
| 2,951,743 | 9/1960 | Kretzschmar | 23—123X |
| 3,078,146 | 2/1963 | Savage | 23—123 |
| 3,211,521 | 10/1965 | George et al. | 23—123X |
| 3,240,562 | 3/1966 | Brown et al. | 23—102X |
| 3,320,032 | 5/1967 | Feller | 23—92X |
| 3,330,622 | 7/1967 | Saeman | 23—123 |
| 3,343,912 | 9/1967 | Schluz | 23—102 |
| 3,383,166 | 5/1968 | Gerry et al. | 23—102 |

EDWARD STERN, Primary Examiner

U.S. Cl. X.R.

23—102, 123, 142